April 19, 1955   V. E. JEWELL ET AL   2,706,570
BALE LOADING ATTACHMENT FOR AUTOMOTIVE VEHICLE
Filed Dec. 12, 1952                                            4 Sheets-Sheet 2

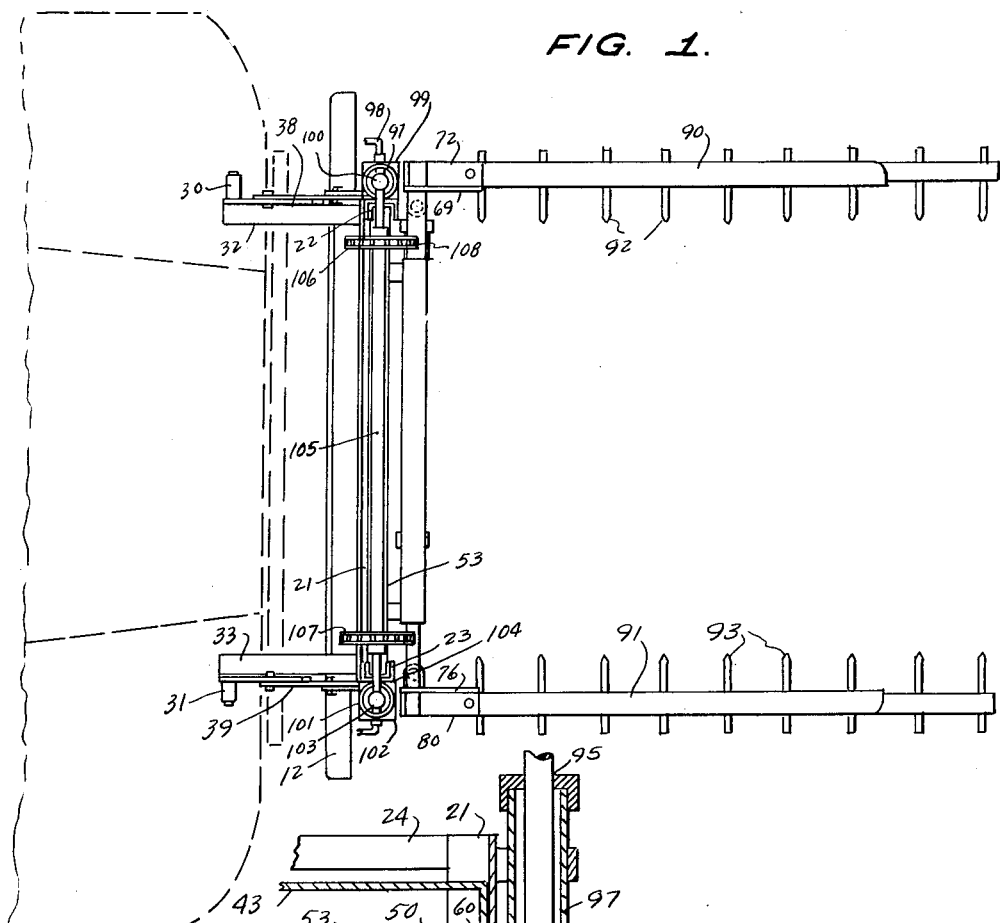
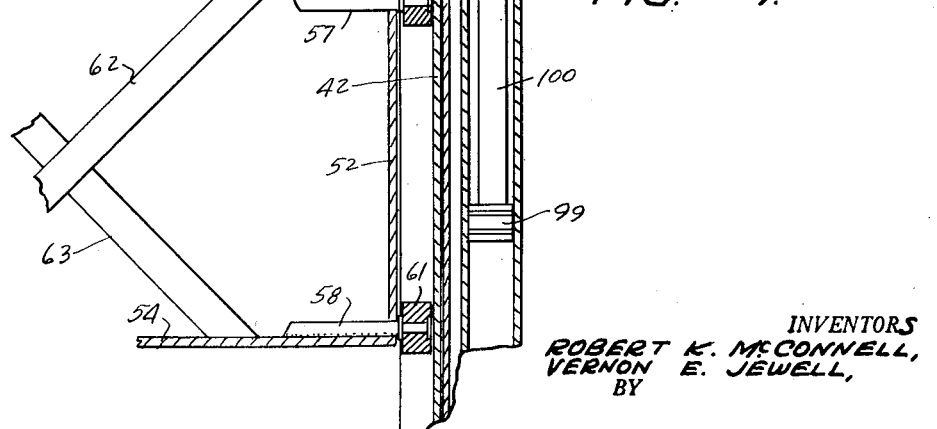
FIG. 1.
FIG. 7.
INVENTORS
ROBERT K. McCONNELL,
VERNON E. JEWELL,
BY
McMorrow, Berman + Davidson
ATTORNEYS.

INVENTORS
ROBERT K. McCONNELL,
VERNON E. JEWELL,
BY
McMorrow, Berman & Davidson
ATTORNEYS.

INVENTORS
ROBERT K. McCONNELL,
VERNON E. JEWELL,
BY
McMorrow, Berman + Davidson
ATTORNEYS

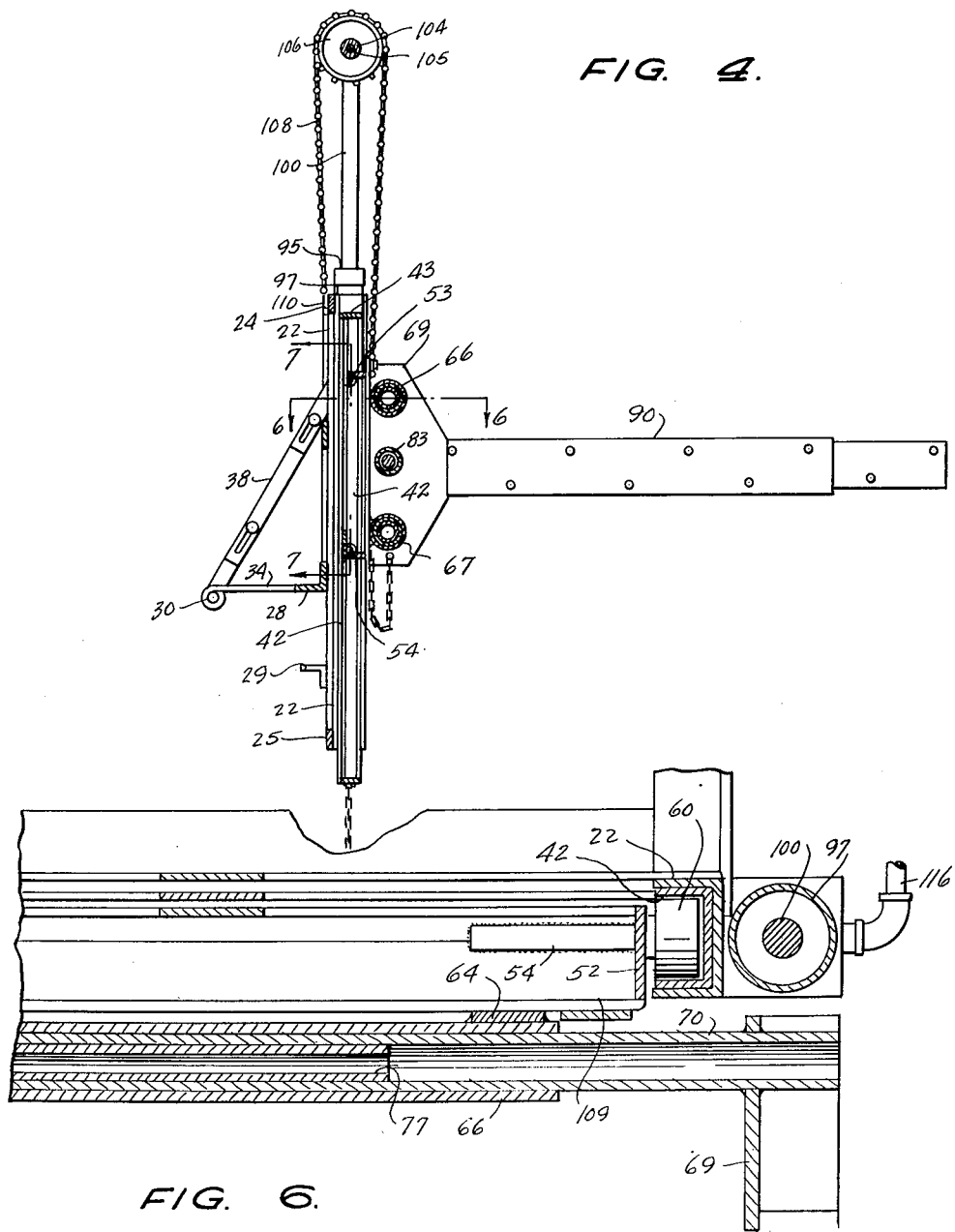

United States Patent Office 2,706,570
Patented Apr. 19, 1955

2,706,570

BALE LOADING ATTACHMENT FOR AUTOMOTIVE VEHICLE

Vernon E. Jewell and Robert K. McConnell, Greeley, Colo.

Application December 12, 1952, Serial No. 325,564

2 Claims. (Cl. 214—653)

This invention relates to bale handling or loading attachments for automotive vehicles, such as the tractor units of tractor-trailer road vehicles, and more particularly to a power actuated lift attachment for such a vehicle.

It is among the objects of the invention to provide an improved power operated lift attachment which can be easily mounted on an automotive vehicle, such as a farm or road tractor, having no hoist mast as a part of its original equipment; which is effective to grasp objects, such as bales of hay, and raise the objects from the ground and place them on a load-carrying structure, such as the platform of the trailer unit of a tractor-trailer road vehicle; which is controlled by the operator of the vehicle from the operator's compartment of the associated vehicle; which is effective to lift and move a number of bales at the same time; and which is simple and durable in construction, economical to manufacture, easy to install, and positive and effective in operation.

Other objects and advantages will become apparent from a consideration of the following description and the appended claims in conjunction with the accompanying drawings wherein:

Figure 1 is a top plan view of a lift attachment illustrative of the invention operatively disposed relative to the front end of a supporting vehicle;

Figure 4 is a cross sectional view on the line 4—4 of Figure 3;

Figure 6 is a fragmentary cross sectional view on an enlarged scale on the line 6—6 of Figure 4;

Figure 7 is a fragmentary cross sectional view on an enlarged scale on the line 7—7 of Figure 4.

Figure 2:
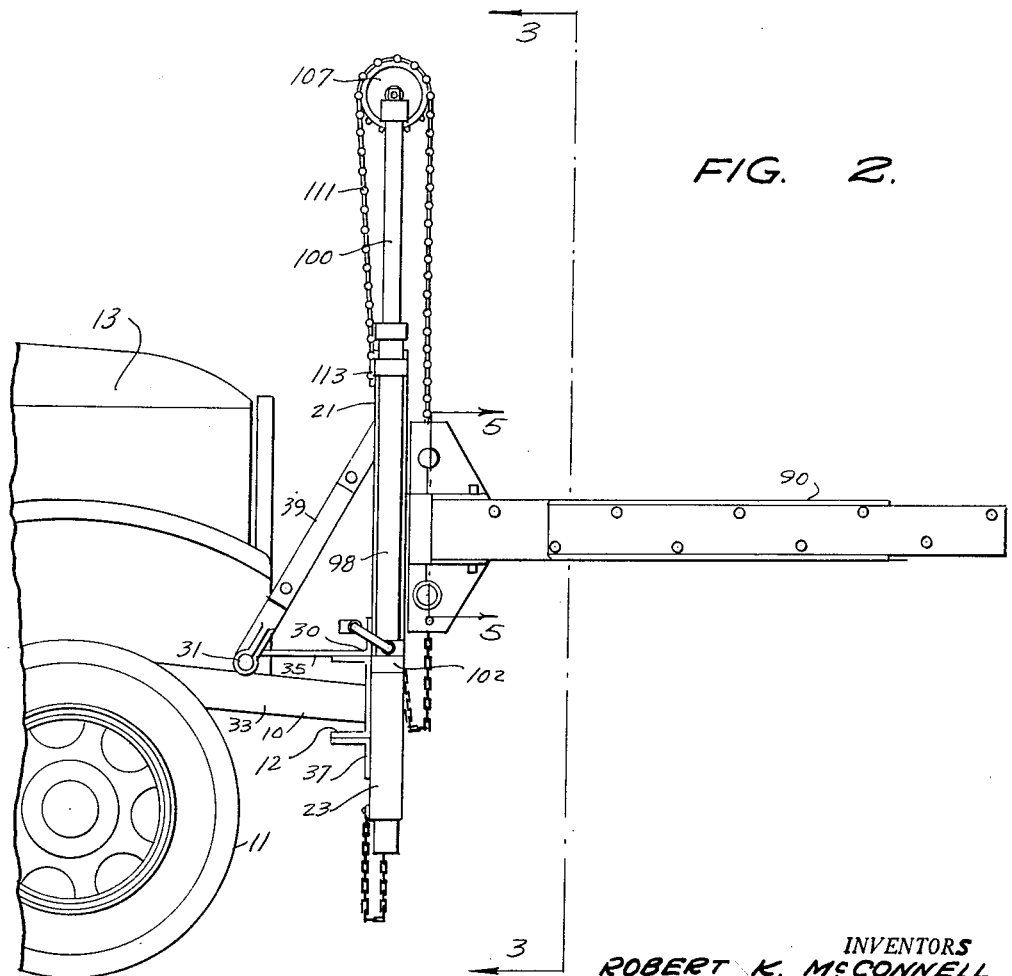
Figure 2 is a side elevational view of the lift attachment and of a fragmentary front end portion of the supporting vehicle.
Figure 3:
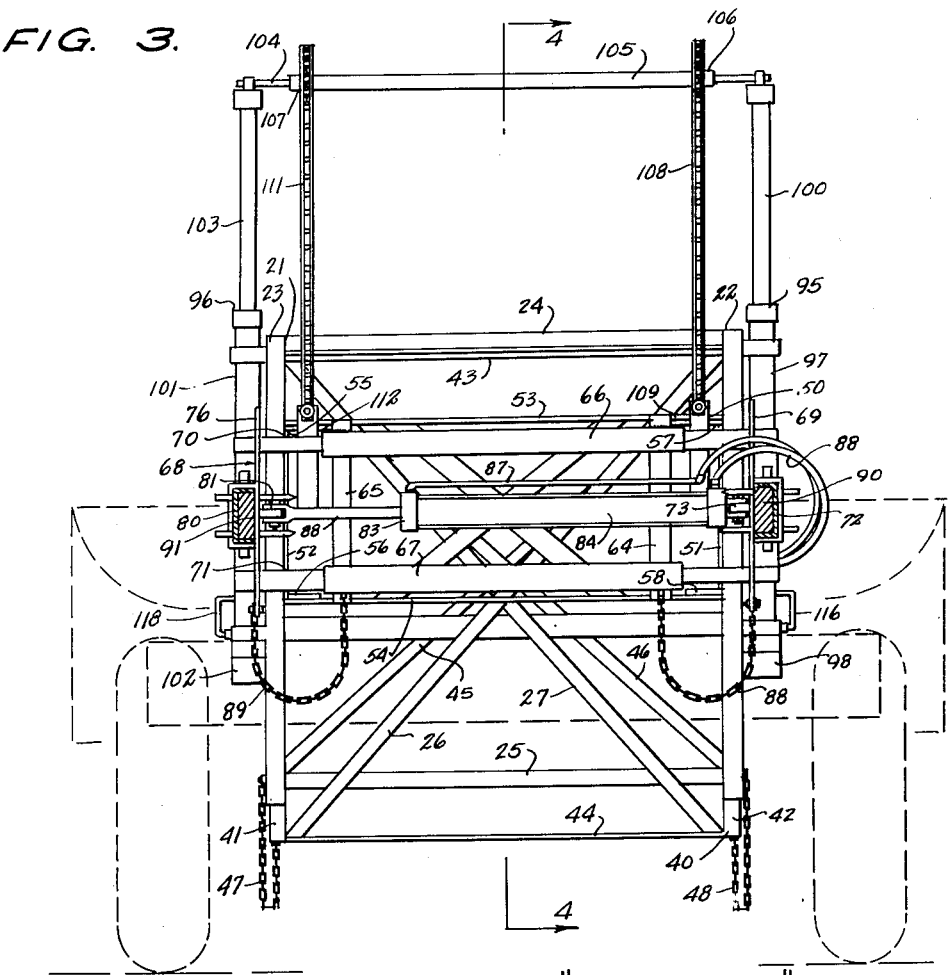
Figure 3 is a cross sectional view on the line 3—3 of Figure 2.
Figure 8:
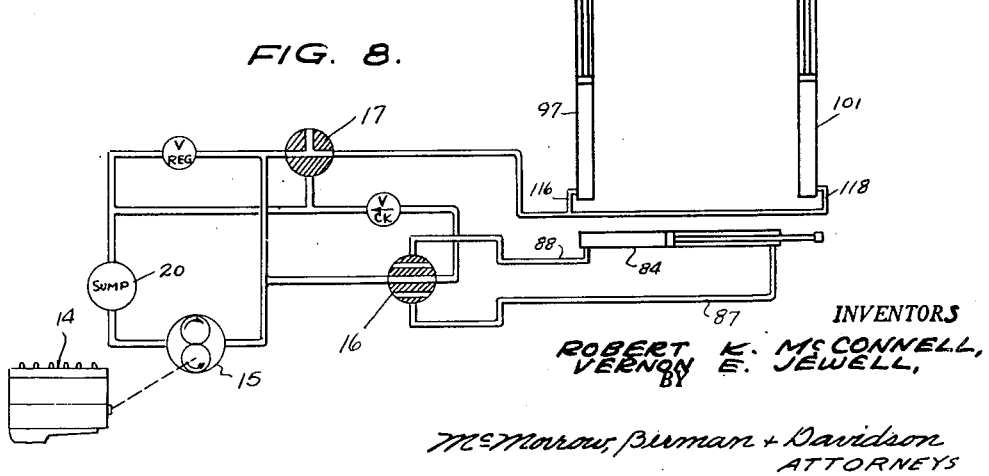
Figure 8 is a schematic hydraulic diagram of the attachment.

With continued reference to the drawings, the supporting vehicle, the front end portion of which is fragmentarily illustrated in Figures 1 and 2, may be the tractor unit of a tractor-trailer road vehicle and comprises a frame structure 10, supported at its front end on the vehicle front wheels 11 and provided across its front end with a front bumper 12 which is channel-shaped in cross section. An engine compartment 13 is mounted on the front portion of the vehicle frame 10 and a cab, not illustrated, including an operator's compartment is mounted on the frame at the rear end of the engine compartment. The engine compartment 13 contains an engine 14 as diagrammatically illustrated in Figure 8, a hydraulic fluid pump, as indicated at 15 driven by the engine and capable of delivering hydraulic fluid at high pressure. Valves 16 and 17 are mounted in the driver's compartment of the vehicle within convenient reach of the vehicle driver or operator, a fluid pressure line leads from the outlet of the pump 15 to the valves 16 and 17 and a fluid return line 19 leads from the valves back to the intake of the pump 15, preferably through a sump or fluid reservoir 20.

The lift attachment comprises a first frame 21 of rectangular shape disposed in upright position at the front side of the vehicle front bumper 12. This first frame comprises a pair of channel-shaped end members 22 and 23 which are vertically disposed in spaced apart and substantially parallel relationship to each other and spaced substantially equal distances from the midlength location of the front bumper 12 with their open sides facing each other. A top member 24 extends between and is secured at its opposite ends to the frame end members 22 and 23 at the upper ends of the end members and a bottom member 25 extends between and is secured at its opposite ends to the side members 22 and 23 near the bottom ends of the end members. Diagonal braces 26 and 27 extend between diagonally opposite corners of the frame 21 to rigidly maintain this frame in rectangular shape and angle brackets 28 and 29 are secured to the end member 22 one at the upper side and one at the lower side of the front bumper 12 of the vehicle and overlie and are secured to the top and bottom flanges of the channel-shaped front bumper to securely mount the corresponding end of the frame 21 on the vehicle. Similar angle brackets 36 and 37 are mounted on the frame end member 23 and bear against the top and bottom flanges of the vehicles front bumper to securely mount the end member 23 of the frame 21 on the vehicle.

Lugs 30 and 31 are mounted on the vehicle side frame members 32 and 33 respectively, rearwardly of the front bumper 12 of the vehicle and extension bars 34 and 35 extend from the top angle brackets 36 and 28 respectively rearwardly to the lugs 30 and 31.

Adjustable length braces 38 and 39 extend rearwardly and downwardly from the frame end members 22 and 23 respectively at locations above the top angle brackets 36 and 28 to the lugs 30 and 31 for holding the frame end members 22 and 23 in upright and substantially vertical position on the front bumper 12 of the vehicle.

A second frame 40, of rectangular shape, is slidably mounted in the fixed frame 21 and comprises end members 41 and 42 of channel shape cross section received in the end members 22 and 23 respectively of the fixed frame and longitudinally slidable in the corresponding end members of the fixed frame. The second frame 40 has a height somewhat less than the height of the fixed frame and has a top member 43 extending between the end members 41 and 42 and secured at its respectively opposite ends to these end members at the top of the frame 40 and a bottom member 44 extending between the end members 41 and 42 and secured at its respectively opposite ends to the bottom ends of these end members. Diagonal braces 45 and 46 extend between the diametrically opposite corners of the frame 40 to hold this frame rigidly in rectangular shape for vertical movement in the guideways provided by the end members 22 and 23 of the frame 21.

Suitable flexible elements, such as the chains 47 and 48 are connected between the bottom ends of the frame end members 22 and 23 respectively and the bottom ends of the corresponding secondary end frame members 41 and 42 to limit downward movement of the frame 40 relative to the fixed frame 21 so that the bottom end of the frame 40 cannot at any time strike the ground below the vehicle.

A third frame 50 of rectangular shape and having a height materially less than the height of the frame 40, is slidably mounted in the frame 40 for vertical movement relative to the frames 21 and 40. The third frame comprises flat end members 51 and 52 disposed in spaced apart and substantially parallel relationship and slightly within the end members 41 and 42 respectively of the frame 40, and top and bottom members 53 and 54 disposed in spaced apart and substantially parallel relationship to each other and perpendicular relationship to the end members 51 and 52, the top member being joined at its opposite ends to the top ends of the end members 51 and 52 and the bottom member 54 being joined at its opposite ends to the bottom end of these end members.

Arbors 55 and 56 are mounted on the top and bottom members 53 and 54 respectively of the frame 50 and extend outwardly beyond the end member 51 and rollers, not illustrated, are journaled one on each of these arbors at the outer side of the end member 51 and are received in the channel-shaped end member 41 of the frame 40 at spaced apart locations along this end member. Similar arbors 57 and 58 are secured to the top and bottom members 53 and 54 of the frame 50 at the opposite end of this frame and extend outwardly through the frame end member 52 into the channel-shaped end member 42 of the frame 40. Rollers 60 and 61 are journaled on the arbors 57 and 58 respectively and receive in the frame end member 42, the rollers on the opposite ends of the frame 50 mounting this frame in the frame 40 for vertical movement of the frame 50 relative to the frames 21 and 40.

Diagonal braces 62 and 63 extend between the top and bottom members 53 and 54 of the frame 50 to rigidly maintain this frame in its rectangular shape and struts or battens 64 and 65 extend from the top member 53 to the bottom member 54 of the frame 50 with the strut 61 disposed adjacent and substantially parallel to the end member 51 and the batten 65 disposed adjacent and substantially parallel to the end member 52.

Tubular guideways 66 and 67 are mounted on the frame 50, the guideway 66 being disposed adjacent and substantially parallel to the top member 53 of the frame 50 and secured near its opposite ends to the battens 64 and 65 and the tubular guideway 67 being disposed adjacent and substantially parallel to the bottom member 54 of the frame 50 and secured near its opposite ends to the battens 64 and 65.

A carriage structure, generally indicated at 68, is disposed at one end of the frame 50 and comprises a flat plate 69 disposed substantially parallel to the end member 51 of the frame 50 and tubular stems 70 and 71 extending perpendicularly from the plate 69 and slidably received in the guide tubes 66 and 67 respectively. A socket 72 of rectangular cross sectional shape is mounted on the outer side of the plate 69 between the stems 70 and 71 with its longitudinal center line substantially perpendicular to the planes of the several frames 21, 40 and 50 and an apertured lug 73 projects from the inner side of the plate 69 substantially midway between the stems 70 and 71.

A similar carriage structure 75 is disposed at the opposite end of the frame 50 and comprises a flat plate 76 disposed substantially parallel to the end member 52 of the frame 50 and tubular stems 77 and 78 projecting perpendicularly from the plate 76 and slidably received in the tubular guides 66 and 67 respectively.

Figure 5:
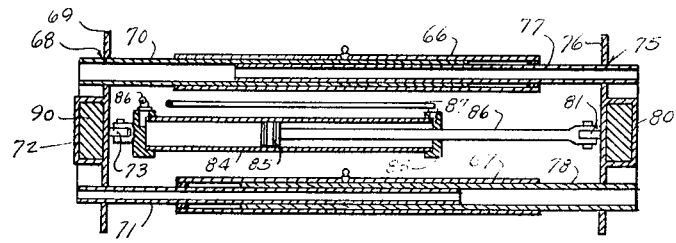
Figure 5 is a cross sectional view on the line 5—5 of Figure 2.

It will be noted that in the arrangement illustrated in Figure 5 the upper stem 70 of the carriage structure 68 fits slidably into the tubular guide 66 and the upper stem 77 of the carriage structure 75 fits slidably into the tubular stem 70 and that the lower stem 78 of the guide structure 75 fits slidably into the lower tubular guide 67 and the lower stem 71 of the guide structure 68 fits slidably into the stem 78. The horizontally disposed guides 66 and 67 and the associated stems of guide structure provide for horizontal movement of the guide structures toward and away from each other for a purpose to be presently described.

A socket 80 of rectangular cross sectional shape is mounted on the plate 76 of the carriage structure 75 between the stems 77 and 78 at the outer side of the plate and an apertured lug 81 projects from the inner side of the plate 76 substantially midway between the stems 77 and 78.

A hydraulic device 83 is disposed between and extends longitudinally of the guide tubes 66 and 67 and comprises a hydraulic cylinder 84 pivotally secured at one end to the lug 73 on the plate 69, a piston 85 reciprocable in the cylinder 84, and a piston rod 86 connected to the piston and extending through the end of the cylinder 84 remote from the lug 73 and pivotally connected at its end remote from the piston to the lug 81 carried by the plate 76. A fluid conduit 87 leads from one end of the cylinder 84 and a fluid conduit 88 leads from the other end of the cylinder 84 to the valve 16, this valve being effective to selectively connect either end of the cylinder 84 to the fluid pressure at the outlet of the pump 15 and the other end of the cylinder to the pump inlet or the sump 20 so that the hydraulic device 83 can be caused to expand or contract under manual control.

When the hydraulic device 83 expands the plates 69 and 76 and the corresponding sockets 72 and 80 are moved away from each other and, when the hydraulic device contracts these plates are moved toward each other.

An arm 90 of elongated, rectangular cross sectional shape is detachably received at one end in the socket 72 and a similar arm 91 is detachably received at one end in the socket 80. The arms 90 and 91 are substantially horizontally disposed and extend forwardly from the frame 50 in spaced apart and substantially parallel relationship to each other. Spikes 92 project perpendicularly from the inner side of the arm 90 at spaced apart locations along this arm and similar spikes 93 project perpendicularly from the inner side of the arm 91 at locations spaced apart along this arm and are opposed to the spikes 92.

When the hydraulic device 83 is contracted the arms 90 and 91 are moved together to grasp objects, such as bales of hay, between the arms and to insert the spikes 92 and 93 into the bales so that the bales can be lifted by the arms, and, when the hydraulic device is expanded, the arms 90 and 91 are moved apart to release the bales from between these arms.

Hydraulic devices 95 and 96 are disposed in substantially vertical positions at the outer sides of the end members 22 and 23 respectively of the fixed frame and the device 95 comprises a cylinder 97 mounted at its lower end on a bracket 98 which projects outwardly from the frame end member 22 near the upper angle bracket 28 by which this frame member is secured to the vehicle front bumper 12, a piston 99 reciprocable in the cylinder 97 and a piston rod 100 extending from the piston 99 through the upper end of the cylinder 97. The device 96 includes a cylinder 101 mounted at its lower end on a bracket or block 102 projecting outwardly from the frame end member 23 adjacent the upper angle bracket 36 which mounts this frame member on the vehicle front bumper 12, a piston, not illustrated, reciprocable in the cylinder 101 and a piston rod 103 extending from the piston in the cylinder 101 through the upper end of this cylinder.

A shaft 104 is disposed above and substantially parallel to the top member 24 of the frame 21 and is secured at its respectively opposite ends to the piston rods 100 and 103 at the top ends of these piston rods. A sleeve 105 is rotatably mounted on the shaft 104 between the piston rods 100 and 103 and chain sprockets 106 and 107 are mounted on the sleeve 105 near the respectively opposite ends of the sleeve.

A chain 108 is trained over the sprocket 106 and is secured at one end to the upper end of a vertically disposed strap 109 mounted on the frame 50 between the batten 64 and the adjacent end of this frame. The other end of the chain 108 is connected to the upper end of the end member 22 of the frame 21, as indicated at 110 in Figure 4.

A chain 111 is trained over the sprocket 107 and connected at one end to the upper end of a strap 112 secured to the frame 50 between the batten 65 and the adjacent end of the frame and the other end of the chain 111 is secured to the upper end of the end member 23 of the frame 21, as indicated at 113 in Figure 2.

A fluid conduit 116 leads from the bottom end of the hydraulic cylinder 97 to the valve 17 and a similar conduit 118 leads from the bottom end of the cylinder 101 to this same valve.

The valve 17 is effective to connect the bottom ends of the cylinders 97 and 101 to the fluid outlet pressure of the pump 15 to expand the hydraulic devices 95 and 96 and to connect the bottom ends of these cylinders to the pump inlet or sump to permit gravity contraction of the devices 95 and 96 under the weight of the mechanism carried by these devices and the weight of any load that may be supported by the arms 90 and 91.

In the operation of the device, with the arms 90 and 91 separated to receive one or more bales therebetween, the vehicle is moved until the selected bales are disposed between the arms and the hydraulic device 83 is then actuated to bring the arms together against the bales disposed therebetween and to force the spikes 92 and 93 into the bales. Other bales may be piled on top of the bales clamped between the arms 90 and 91, if desired. When the bottom bales have been securely clamped between the arms, the hydraulic devices 95 and 96 are operated to raise the frame 50. The frame 50 will then move upwardly in the frame 40 until the top member 53 of the frame 50 engages the top member 43 of the frame 40 at which time both frames 50 and 40 will move upwardly together in the fixed frame 21. The arms will then have been raised to a height from which the bales carried thereby can be placed on a load-carrying structure, such as the platform of a trailer unit of a tractor-trailer road vehicle. When the bales have been placed on the load-carrying structure the hydraulic device 83 is actuated to move the arms apart and out of engagement with the bales disposed therebetween whereupon the automotive vehicle and bale loading attachment may be moved away from the bales and to a location to pick up a new load of bales.

When the frame 50 is lowered by permitting the hydraulic units 95 and 96 to contract to bring the arms 90 and 91 close to the ground to pick up a new load of bales the frame 40 also descends to a limiting position at which its lower end is disposed below the lower end of the fixed frame 21 so that the frame 40 serves as a guide for the frame 50 while the frame 50 is in its lower position. When the frame 50 is raised to its upper position, however, the frame 40 is also raised so that its lower end is not materially below the lower end of the fixed frame 21 and does not, in such position, interfere with the movement of the associated vehicle over obstructions which may be in its path.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A load handling mechanism for industrial trucks and like vehicles, comprising: a support frame adapted to be fixedly connected to an industrial truck; a movable frame mounted on the support frame for up-and-down adjustment; a pair of transversely extending, open-ended, vertically spaced, horizontally disposed tubular guides fixed to the movable frame medially between the opposite sides thereof; a pair of carriage structures spaced from the ends of the guides and disposed at opposite sides of the movable frame, each carriage structure including a vertically disposed plate and vertically spaced first and second tubular stems rigid at one end with the plate and extending horizontally toward the plate of the other carriage structure, the other ends of the stems being slidably engaged in the respective guides, one stem of each structure being coaxial with and being telescopically related to within the guide slidably engaging the same, one of the stems of the other carriage structure, said stems connecting the carriage structures for horizontal adjustment of the movable frame; hydraulic means connected between the carriage structures between and in close proximity to said tubular guides and expanding and contracting in a horizontal direction to correspondingly adjust the carriage structures; and load support arms carried by the respective plates and projecting substantially horizontally therefrom in perpendicular relation to the plane of said movable frame.

2. A load handling mechanism for industrial trucks and like vehicles, comprising: a support frame adapted to be fixedly connected to an industrial truck; a movable frame mounted on the support frame for up and down adjustment; a pair of transversely extending, open-ended, vertically disposed tubular guides fixed to the movable frame medially between the opposite sides thereof; a pair of carriage structures spaced from the ends of the guides and disposed at opposite sides of the movable frame, each carriage structure including a vertically disposed plate and vertically spaced first and second tubular stems rigid at one end with the plate and extending horizontally toward the plate of the other carriage structure, the first stem being greater in diameter than the second, the other ends of the stems being slidably engaged in the respective guides, the second stem of each structure telescoping, within the guides slidably engaging the same, into the first stem of the other carriage structure, the pairs of telescopically related stems connecting the carriage structures for horizontal adjustment toward and away from one another in each position of adjustment of the movable frame; hydraulic means connected between the carriage structures between and in close proximity to said tubular guides and expanding and contracting in a horizontal direction to correspondingly adjust the carriage structures; and load support arms carried by the respective plates and projecting substantially horizontally therefrom in perpendicular relation to the plane of said movable frame.

References Cited in the file of this patent

UNITED STATES PATENTS

| Number | Name | Date |
|---|---|---|
| 2,170,932 | Venema | Aug. 29, 1939 |
| 2,394,458 | Lull | Feb. 5, 1946 |
| 2,420,828 | King | May 20, 1947 |
| 2,571,550 | Ehmann | Oct. 16, 1951 |
| 2,609,114 | Backofen et al. | Sept. 2, 1952 |
| 2,611,497 | Backofen | Sept. 23, 1952 |
| 2,613,830 | Ponnequin | Oct. 14, 1952 |
| 2,653,678 | Lehrman | Sept. 29, 1953 |
| 2,665,022 | Dunham | Jan. 5, 1954 |